Dec. 14, 1971  R. E. MILEY ET AL  3,626,676

SAFE START SYSTEM FOR RIDING MOWERS

Filed April 15, 1970

INVENTORS
R. E. MILEY &
R. A. PETERSON, JR.

BY of the starter rope 44, the switch 40 will close and short the ignition system for the engine.

Therefore, before the engine 24 can be started the riding mower has to be completely demobilized and the hazards of starting the riding mower are eliminated.

While only a single embodiment of the invention has been described and illustrated, various modifications within the spirit and scope of the invention will be apparent to those skilled in the art and can be made without departing from the underlying principles thereof.

We claim:

1. In combination with a riding mower including a chassis mounted on steerable and traction wheels, an engine having an ignition system mounted on the chassis, means providing a driving connection between the engine and traction wheels and including a first engageable and disengageable clutch means for selectively establishing and disrupting the driving connection, a driven mower unit coupled to the chassis, and means providing a driving connection between the engine and mower unit and including a second engageable and disengageable clutch means for selectively establishing and disrupting the driving connection between the engine and mower unit, a safe start electrical system comprising: first electrical switch means mounted on the chassis and responsive to the condition of the first clutch means to be open when the first clutch means is disengaged and closed when the first clutch means is engaged; second electrical switch means mounted on the chassis and responsive to the condition of the second clutch means to be open when the second clutch means is disengaged and closed when the second clutch means is engaged; third electrical switch means mounted on the engine and responsive to the condition of the engine to be closed when the engine is being started and normally open when the engine is running, and electrical conductor means connecting the third switch means with the engine ignition system and the first and second switch means with the chassis and third switch means in parallel with each other and in series with the third switch means, whereby the engine will be grounded if either or both of the first and second clutch means are engaged when the engine is being started.

2. The combination set forth in claim 1 wherein the engine is a recoil rope start engine having a starter rope with a handle thereon, the third switch means has an arm movable between open and closed positions, and biased toward the closed position, and the third switch means is mounted on the engine with its arm extending across the path of movement of the starter rope handle whereby when the starter rope is recoiled, its handle will contact the switch arm and move the same to its open position.

3. The combination set forth in claim 2 wherein first and second pedal means are movably mounted on the chassis for independent movement between first and second positions and are operatively connected to the first and second clutch means to engage and disengage the respective clutch means upon movement to the first and second positions respectively, each of the first and second switch means has an arm movable between open and closed positions and biased toward the closed position, and the first and second switch means are mounted on the chassis in positions adjacent the first and second pedal means with their respective arms extending across the paths of movement of the first and second pedal means respectively, whereby, upon movement of either pedal means to its second position, it will contact the arm of its respective switch and move the same to its open position.

4. The combination set forth in claim 3 wherein brake means are provided for the rear traction wheels and are operatively coupled to the first pedal means for application upon movement of the first pedal means to its second position whereby the brake means must be applied before the engine can be started.

References Cited
UNITED STATES PATENTS

| | | | |
|---|---|---|---|
| 3,229,452 | 1/1966 | Hasenbank | 180—82 |
| 2,822,795 | 2/1958 | Cicero et al. | 192—.084 |
| 3,169,358 | 2/1965 | Ertsgaard et al. | 56—DIG 15 |

ANTONIO F. GUIDA, Primary Examiner

U.S. Cl. X.R.

180—82; 192—.084, .098

3,626,676
SAFE START SYSTEM FOR RIDING MOWERS
Richard Erwin Miley and Rudolph Andrew Peterson, Jr., Horicon, Wis., assignor to Deere & Company, Moline, Ill.
Filed Apr. 15, 1970, Ser. No. 28,607
Int. Cl. A01d 35/08
U.S. Cl. 56—10.5
4 Claims

ABSTRACT OF THE DISCLOSURE

A safe start electrical system prevents a recoil rope start engine on a riding mower from starting unless the mower is disengaged and the vehicle drive disengaged. The system is based on a switch that is closed when the engine is being started and is opened by the starter rope when the starter rope is recoiled. The switch is connected to the engine ignition system and is connected in series with two additional switches which are also connected to the chassis of the vehicle. One of the additional switches is responsive to the condition of the clutch for the vehicle drive and is closed when the vehicle drive is enaged. The second additional switch is responsive to the condition of the clutch for the mower and is closed whenever the mower clutch is engaged. The safe start electrical system grounds the engine ignition system if an attempt is made to start the engine while either the vehicle clutch or mower clutch is engaged.

BACKGROUND OF THE INVENTION

The present invention relates to riding mowers, and more particularly relates to a safe start electrical system for riding mowers.

A great many riding mowers which are presently available do not have an electric starter and are commonly provided with a recoil rope starter. The basic reason for this is to keep the cost of riding mowers within the price range of the average consumer. However, in order to start many of the riding mowers with recoil rope start engines, it is not possible for the operator to be mounted on the mower and still be in a position where he can readily pull the starter rope. The very fact that the operator cannot be mounted on the vehicle when he starts the engine creates a potential source of danger.

For example, if the operator fails to disengage the drive to the traction wheels of the riding mower before he starts the engine, the mower will take off and run uncontrolled. Also, when the operator braces himself to provide a quick pull on the starter rope, it is very easy to inadvertently place one foot under the mower unit. If the drive for the mower unit is not disengaged before the engine is started, the operator may very easily lose part of his foot.

SUMMARY OF THE INVENTION

It is therefore the primary object of the present invention to provide a safe start electrical system for a riding mower which will prevent the mower engine from being started unless the drives for the traction wheels and mower unit are both disengaged.

Another object of the present invention is to provide a safe start electrical system for riding mowers which grounds the engine of the riding mower whenever an attempt is made to start the engine and either one or both of the drives for the mower traction wheels and the mower unit are engaged.

Still another object of the present invention is to provide a safe start electrical system for riding mowers which prevents the engine of the riding mower from being started unless the drives for the mower unit and mower traction wheels are disengaged and a brake for the traction wheels is applied.

The above and additional objects and advantages of the present invention will become apparent along with details of construction of the preferred embodiment of the invention from a reading of the following detailed description when taken in conjunction with the accompanying drawing.

DESCRIPTION OF THE PREFERRED EMBODIMENT

Figure 2:
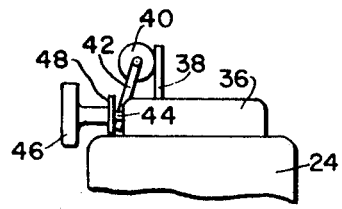
FIG. 2 is an enlarged rear elevational view of the upper portion of the motor for the riding mower.
Figure 1:
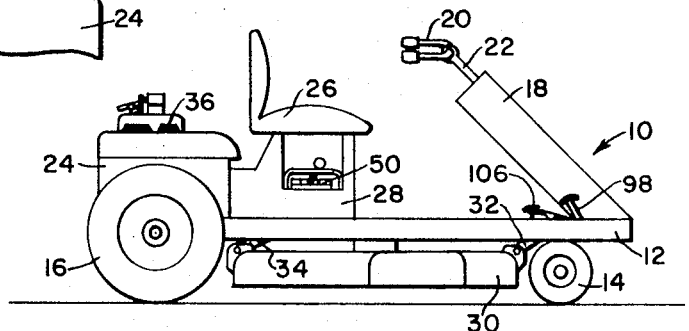
FIG. 1 is a side elevation view of a riding mower embodying the principles of the present invention.
Figure 3:
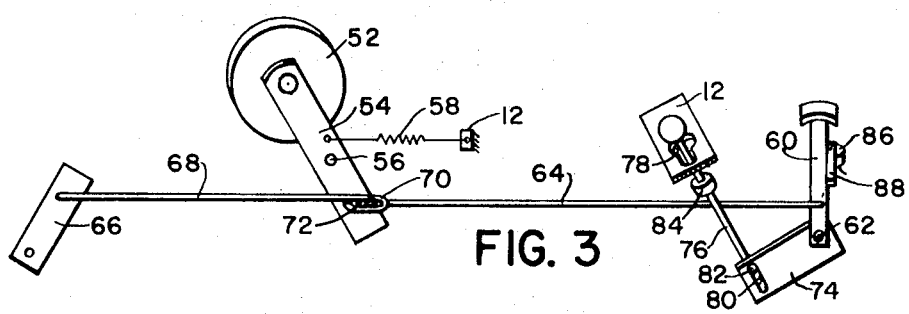
FIG. 3 is a schematic view of the clutch and brake for the traction wheels of the riding mower and the control means therefor.
Figure 4:
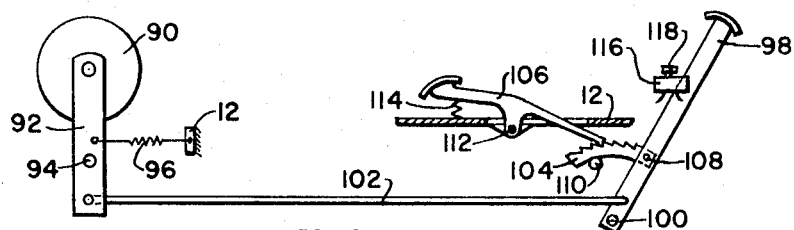
FIG. 4 is a schematic view of the clutch for the mower unit of the riding mower and the control means therefor.
Figure 5:
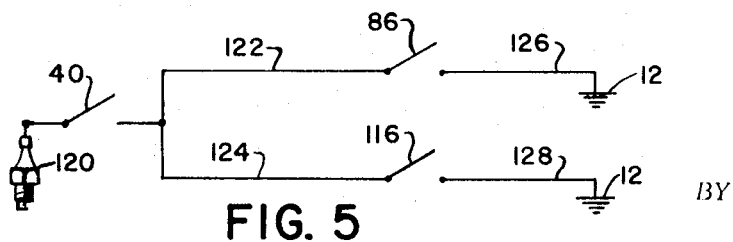
FIG. 5 is a diagram of the circuitry of the safe start electrical system according to the present invention.

Referring now to the drawing, a riding mower in which the principles of the present invention are incorporated is indicated generally at 10 and includes a chassis 12 mounted on front steerable wheels 14 and rear traction wheels 16. A steering pedestal 18 is mounted on the forward end of the chassis 12 and supports a steering handle bar 20. The handle bar 20 is mounted on a steering rod 22 which extends down through the steering pedestal 18 and is connected to conventional steering linkage for the front wheels 14. An engine 24 is mounted on the rear end of the chassis 12, and immediately ahead of the engine 24, a seat 26 is mounted on a pedestal 28. A rotary cutter unit 30 is suspended beneath the chassis 12 intermediate the front and rear wheels by front and rear suspension links 32 and 34.

The engine 24 is the type having a vertical crank shaft which has its output end extending below the chassis 12. A conventional recoil rope starter 36 is mounted on the top of the engine 24 and is connected to the upper end of the crank shaft in the conventional manner. A bracket 38 is secured to the top of the recoil rope starter 36 and carries a single pole switch 40. The switch 40 is controlled by an arm 42 which extends down along side the starter rope 44 and in the path of movement of the starter handle 46. The switch arm 42 is normally biased to a closed position away from the recoil rope starter 36 so that when the starter handle 46 is pulled to start the engoine 24, the switch arm 42 will move away from the starter 36 to its closed position. When the rope 44 is allowed to recoil, the handle 46 will engage the switch arm 42 and move the same to its open position. A large washer 48 may be placed on the rope 44 to provide a larger switch arm engaging area on the handle 46.

The engine 24 is drivingly connected to the traction wheels 16 through a transmission 50 which is housed within the seat pedestal 28. The engine 24 is interconnected with the transmission 50 by an endless flexible belt which is loosely trained about drive and driven sheaves mounted on the engine crankshaft and a vertical input shaft for the transmission 50, respectively. The transmission 50 is in turn connected to the drive axle for the rear traction wheels 16 in any suitable manner such as by an endless roller chain which is trained about drive and driven sprockets mounted on a transverse output shaft of the transmission 50 and the drive axle for the rear traction wheels 16 respectively, The endless flexible belt which is trained about the sheaves on the engine crankshaft and transmission input shaft is selectively tensioned